May 22, 1962     D. A. ROGERS, JR., ET AL     3,036,023
SEALANT COMPOSITIONS AND COMMUTATOR SEALED THEREWITH
Filed Nov. 17, 1958
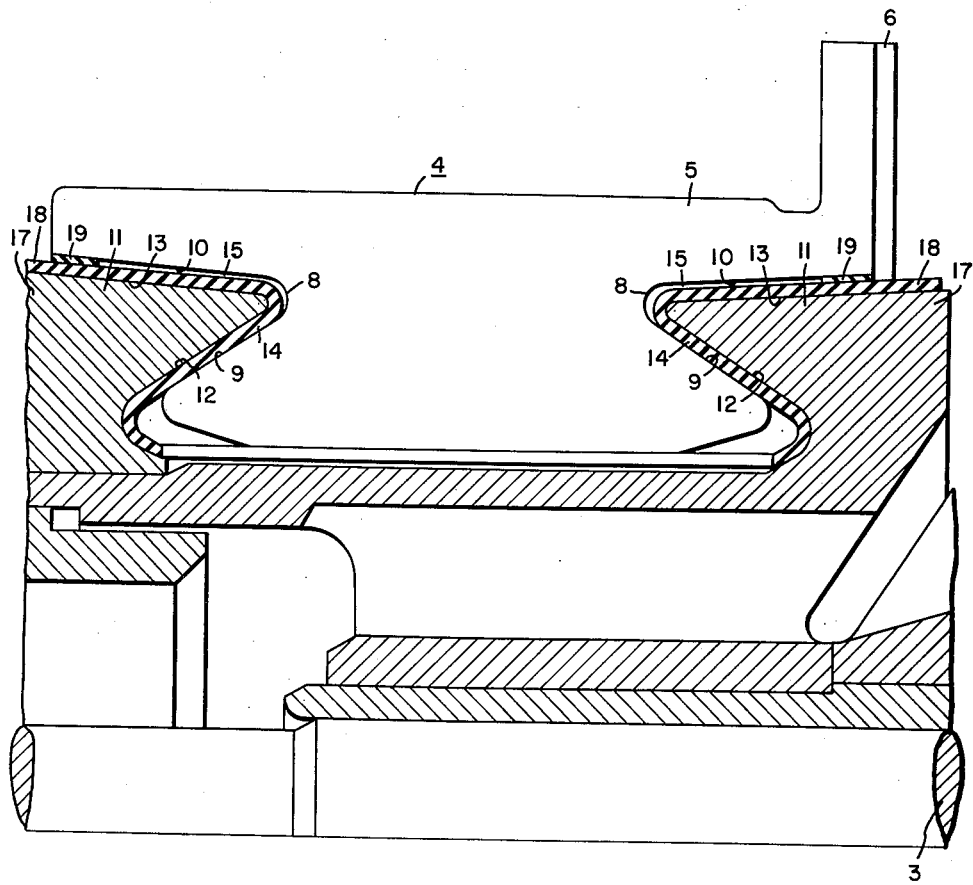
WITNESSES
INVENTORS
Dow A. Rogers, Jr, John L. Schake &
Herbert F. Minter
BY
ATTORNEY United States Patent Office 3,036,023
Patented May 22, 1962

3,036,023
SEALANT COMPOSITIONS AND COMMUTATOR SEALED THEREWITH
Dow A. Rogers, Jr., Wilkins Township, Allegheny County, John L. Schake, Swissvale, and Herbert F. Minter, Pittsburgh, Pa., assignors to Westinghouse Electric Corporation, East Pittsburgh, Pa., a corporation of Pennsylvania
Filed Nov. 17, 1958, Ser. No. 774,279
7 Claims. (Cl. 260—2.5)

The present invention relates to resinous compositions particularly adapted to be applied to commutators of electrical machines and has particular reference to V ring type commutator assemblies of the wholly arch-bound type embodying such sealants.

In the building of such commutators, clamping V rings made of steel or the like are introduced into the notches located at either end of the commutator bars and interposed bars of mica or other insulating material. A V ring of mica or other insulating material is interposed between the clamping rings and the notches in the bars. The various elements are assembled under arch-binding conditions whereby only the inner conical surface of each clamping ring makes pressure transmitting engagement against the corresponding inner arch binding surfaces of the notches in the bars through the intermediary of the interposed mica V rings. The outer conical surfaces of the clamping V rings, together with the overlying outer surfaces of the insulating mica V rings, are spaced out of pressure transmitting engagement with respect to the outer surfaces of the notches in the bars in such manner as not to press outwardly on any portion of the commutator bars. As a result, a clearance space or circumferential gap exists between the outer surfaces of the clamping V rings and overlying mica V rings and the inner surfaces of the notches in the bars.

Experience has shown that this clearance space must be closed or sealed to prevent the accumulation or deposition therein of dirt, carbon dust from the commutator brushes, or other foreign matter. When carbon dust or other conducting foreign matter is permitted to deposit and accumulate in the clearance space electrical shorts between bars of the commutator frequently occur.

Heretofore, attempts have been made to provide means for sealing or closing this clearance space against the entrance of dirt and the like. In general, however, such attempts have not resulted in the provision of completely satisfactory seals.

The object of the present invention is to provide a solid, tough composition suitable for flexibly sealing a commutator assembly against the accidental entrance thereinto of foreign matter.

Another object of the present invention is to provide a solid, tough, foamed commutator sealant within the clearance space defined by the outer conical surfaces of the clamping V rings and overlying mica V rings and the inner surfaces of the notches in the ends of the commutator bars for flexibly sealing said clearance space against the accidental entry thereinto of foreign matter.

Still another object of the invention is to provide a solid, tough composition comprising critical amounts of certain thermosettable epoxy resins plasticized with polyester resins and formulated with certain fillers and foaming agents, said composition being adapted for application to commutator assemblies to flexibly seal the same against foreign matter.

To indicate more fully the advantages and capabilities of the present invention, together with other and further objects thereof, reference is made to the following description taken in conjunction with the accompanying drawing which illustrates, in a fragmentary longitudinal sectional view, the commutator end of an electrical machine embodying a commutator sealant composition in accordance with the present invention.

It will be understood that embodiments of the invention, other than those illustrated and described, employing the same or equivalent principles may be used and that structural changes may be made as desired without departing from the true scope of the invention.

In accordance with the present invention and in the attainment of the foregoing objects, commutator sealant compositions which thermoset to foamed tough and flexible resin bodies are provided. Such compositions comprise an intimate admixture of (A) from 85% to 60% by weight of a resin system including epoxy resin-dimer acid plasticized with a polyester resin, (B) from 15% to 40% by weight of a specific filler, and (C) from 0.1% to 15% by weight of a foaming or blowing agent.

This composition is of putty-like consistency. It may be applied to the commutator assembly from a gun or other extruding device, by hand, or the like. The putty-like material cures in place on the commutator assembly to a tough, flexible material on heating in the presence of a catalyst for the epoxy resin. The thermoset material is slightly foamed due to the incorporation therein of a foaming or blowing agent, resulting in a soft spongy sealant composition. The composition has excellent thermal stability and is able to withstand the elevated temperatures encountered both during the building of arch-bound commutator assemblies and in service of electrical machines in which such assemblies are embodied.

The resin portion of the sealant composition of this invention comprises from about 1.25 to 2.5 parts by weight of a specific epoxy resin-dimer acid adduct for each one part by weight of polyester resin plasticizer. The epoxy resin-dimer acid adduct is an essential component of the present composition. Thus, after the composition is cured to a thermoset resilient solid on the commutator assembly, it adheres well to both the mica in the V ring and the copper in the commutator to effectively seal the commutator clearance space herein described. The excellent adhesion referred to is believed to be attributable to the epoxy resin-dimer acid adduct. Further, it is believed that the composition remains resilient throughout the life of the commutator because of the plasticizing action of the polyester resin.

The epoxy resin-dimer acid component of the composition of this invention comprises from 10 to 90 parts by weight of epoxy resin and from 90 to 10 parts by weight of dimer acid.

A resinous polymeric epoxide, also known as glycidyl polyether, suitable for use in accord with the present invention may be prepared by reacting predetermined amounts of at least one polyhydric phenol and at least one epihalohydrin in an alkaline medium.

Phenols which are suitable for use in preparing such resinous polymeric epoxides include those which contain at least two phenolic hydroxy groups per molecule. Polynuclear phenols which have been used and found to be particularly suitable include those wherein the phenolic nuclei are joined by carbon bridges, for example, 4,4'-dihydroxy-diphenyl-dimethyl methane (referred to hereinafter as bis-phenol "A"), 4,4'-dihydroxy-diphenyl-methyl-methane and 4,4'-dihydroxy-diphenyl-methane. In admixture with the named phenolic nuclear phenols, use also may be made of those polynuclear phenols wherein the phenol nuclei are joined by sulfur bridges, for example, 4,4'-dihydroxy-diphenyl-sulfone.

While it is preferred to use epichlorohydrin as the epihalohydrin in the preparation of the resinous polymeric epoxide starting materials of the present invention, epibromohydrin and the like may also be used advantageously.

In the preparation of the resinous polymeric epoxide, aqueous alkali is employed to combine with the halogen of the epihalohydrin reactant. The amount of alkali employed should be substantially equivalent to the amount of halogen present and preferably should be employed in an amount somewhat in excess thereof. Aqueous mixtures of alkali metal hydroxides such as potassium hydroxide and lithium hydroxide, may be employed although it is preferred to use sodium hydroxide since it is relatively inexpensive.

The resinous polymeric epoxide, or glycidyl polyether of a dihydric phenol, suitable for use in this invention has a 1,2-epoxy equivalent greater than one. By epoxy equivalent, reference is made to the average number of 1,2-epoxy groups:

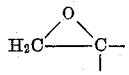

contained in the average molecule of the glycidyl ether. Owing to the method of preparation of the glycidyl polyethers and that they are ordinarily a mixture of chemical compounds having somewhat different molecular weights and contain some compounds wherein the terminal glycidyl radicals are in hydrated form, the epoxy equivalence of the product is not necessarily the integer 2.0. However, in all cases it is a value greater than 1.0. The 1,2-epoxy equivalence of polyethers is thus a value between 1.0 and 2.0.

Resinous polymeric epoxides or glycidyl polyethers suitable for use in accordance with this invention may be prepared by admixing and reacting from 1 to 10 mol proportions of an epihalohydrin, preferably epichlorohydrin, with about 1 mol proportion of bis-phenol "A" in the presence of at least a stoichiometric excess of alkali based on the amount of halogen. To prepare the resinous polymeric epoxides, aqueous alkali, bis-phenol "A" and epichlorohydrin are introduced into and admixed in a suitable reaction vessel. The aqueous alkali serves to dissolve the bis-phenol "A" with the formation of alkali salts thereof. If desired, the aqueous alkali and bis-phenol "A" may be admixed initially and then the epichlorohydrin added thereto, or an aqueous solution of the alkali and bis-phenol "A" may be added to the epichlorohydrin. In any case, the mixture is heated in the vessel to a temperature within the range of about 80° C. to 110° C. for a period of time varying from about one-half hour to three hours, or more depending upon the quantities of reactants used.

Upon completion of heating, the reaction mixture separates into layers. The upper aqueous layer is withdrawn and discarded, and the lower layer is washed with hot water to remove unreacted alkali and halogen salt, in this case, the sodium salt. If desired, dilute acids, for example, acetic acid or hydrochloric acid, may be employed during the washing procedure to neutralize the excess alkali.

The dimer acid constituent of the composition imparts improved flexibility and toughness to the composition and increases the rate at which the composition will cure.

Dimer acids which are suitable for use in this invention comprise polymerized fatty acids derived from unsaturated fatty acids by a reaction known as dimerization. The dimer acid constituent consists essentially of the dimerization product of mono-di- and/or tri-unsaturated acids having a carbon atom chain length of from 10 carbon atoms to 24 carbon atoms per molecule and mixtures thereof. Examples of suitable fatty acids include, myristoleic, linoleic, linolinic, nypogeic and erucic.

The following example illustrates the preparation of an epoxy resin suitable for use in accordance with this invention.

*Example I*

About 54 parts of sodium hydroxide are dissolved in about 600 parts of water in an open kettle provided with a mechanical stirrer. About 1 mol of bis-phenol "A" is added and the resultant mixture is stirred for about 10 minutes at a temperature of about 30° C. Thereafter, approximately 5 mols of epichlorohydrin are added, whereupon the temperature of the resultant mixture increases to about 50° C. to 70° C. due to the heat of reaction. About 42 parts of caustic soda dissolved in about 42 parts of water are then added with continuous stirring and the mixture is maintained at a temperature of about 90° C. to 100° C. for a period of about one hour. The mixture then is permitted to separate into two layers. The upper layer is withdrawn and discarded and the lower layer is washed with boiling water to which may be added acetic acid in an amount sufficient to neutralize unreacted caustic soda. A liquid resinous polymeric epoxide is obtained after substantially all of the wash water has been removed.

A polymeric epoxide resin suitable for use in accordance with this invention can be prepared by substituting from 1 to 10 mols of epichlorohydrin or epibromohydrin for the 5 mols of epichlorohydrin employed in Example I.

*Example II*

Approximately 137 parts by weight of the liquid polymeric epoxy resin of Example I and about 59 parts by weight of a liquid $C_{36}$ dimer acid, prepared by polymerization of linoleic acid, were admixed in a suitable vessel and heat reacted to a viscosity of approximately 40,000 cps. The product thus produced is suitable for use in formulating the sealant compositions of this invention.

The polyester plasticizing component of the sealant composition of this invention is derived by heating above 150° C. but not above 260° C. (*a*) one mol of at least one unsaturated acidic compound selected from the group consisting of fumaric acid, itaconic acid, maleic acid, maleic anhydride, chloromaleic acid, citraconic anhydride, and citraconic acid, (*b*) from 10 to 15 mols of adipic acid, (*c*) from 0.5 to 5 mols of neopentyl glycol, and (*d*) from 14 to 9 mols of ethylene glycol, and, if desired, (*e*) from 0.1 to 0.75 mol of glycerol, the glycols and glycerol being present in amounts sufficient to provide enough hydroxyl groups to exceed by at least 5% but not over 15% the number of carboxyl groups in the adipic acid and the unsaturated acidic compound. The heating is continued until a polyester is obtained having an acid number of below 15 and a Gardner-Holdt viscosity of about G to M in a 50% solution in styrene.

The polyester resin material employed in preparing the sealant composition may be prepared in accordance with usual esterification procedures. Thus, the acidic materials and glycols, and glycerol may be heated in the presence of one or more esterification catalysts, such as mineral acids including hydrochloric and sulfuric acid, as well as organic acids such as benzene sulfonic acid, para-toluene sulfonic acid, and the like. Preferably, the esterification reaction is carried out by heating the materials, in the amounts specified above, to a temperature within the range of about 150° C. to about 260° C. The heating of the mixture is continued with stirring until a polyester resin having an acid number below 20, and preferably below 15 is produced. When the reaction is complete the viscosity of a 50% polyester resin solution in styrene will be about G to M on the Gardner-Holdt scale. However, the viscosity may vary somewhat from these limits. The polyester resin will be of the consistency of a thick syrup before dissolution in the solvent.

It is an important feature of the present invention that up to about 10 mol percent of the adipic acid may be replaced with an equimolar proportion of other saturated aliphatic dicarboxylic acids. Examples of such acids include succinic acid, diglycolic acid, azelaic acid, succinic anhydride, suberic acid and sebacic acid.

It is a further important feature of this invention that the polyester resin can be prepared by substituting up to 20 mol percent of the ethylene and neopentyl glycol with higher glycols. Thus diethylene glycol, 1,3-butylene glycol, triethylene glycol, and the like may be substituted for an equimolar proportion of either the ethylene or neopentyl glycol or both.

We have found that glycerol may be reacted in the amounts of from 0.1 to 0.75 mol percent with advantage. The optimum elastic properties combined with a thermoset condition result from the use of 0.23 to 0.35 mol of glycerol per 13 mols of the two acids. However, the glycerol may be left out, and an excellent resinous composition is produced.

A polyester resin plasticized epoxy resin-dimer acid composition, alone, does not provide satisfactory sealants for commutator assemblies if it simply is admixed with an epoxy resin catalyst and cured in the presence of heat to a thermoset solid. Satisfactory sealant compositions are obtainable only when 15% to 40% by weight of a finely divided inorganic solid filler is admixed with from 85% to 60% by weight of the plasticized resin system herein described. Furthermore, it has been determined that it is critical that at least 10% by weight, based on the weight of the total sealant composition, of the filler must consist of a finely divided silica having an average particle size of less than one micron. The filler, other than the silica portion, may include other solid inorganic materials including calcium silicate, calcium carbonate, aluminum silicate, magnesium silicate, talc, iron oxides, diatomaceous earth, hydrated alumina, hydrated silicates, such, for example, as mica, kaolin, bentonite and glass. If desired, the particles of the filler may be coated with a minor amount of a resin such as a melamine resin, a soap such as aluminum or magnesium stearate, a drying oil such as tall oil, or a fatty acid such as stearic acid.

Blowing or foaming agents also are incorporated in the sealant compositions of this invention for the purpose of providing foamed sealants having satisfactory flexibility characteristics. Examples of suitable blowing agents include ammonium carbonate, potassium bicarbonate or sodium bicarbonate plus small amounts of organic acids including maleic acid, fumaric acid, phthalic acid, isophthalic acid, and terephthalic acid to actuate he carbonate; N-N'-dinitrosopentamethylenetetramine; urea peroxide; sodium ammonium acid phosphate tetra hydrate; calcium acid phosphate; and diazo compounds such as diazoaminobenzene. It will be understood that two or more of these blowing agents may be employed in one composition.

In preparing the sealant compositions the solid fillers and blowing agents are intimately admixed with the resin system in a suitable mixing device. Excellent results have been obtained by intimately admixing the ingredients in a Baker-Perkins internal mixer. Inasmuch as a relatively large amount of filler is incorporated in the sealant compositions a relatively thick, pasty, high viscosity putty-like material is obtained.

The following example illustrates the preparation of polyester resins suitable for use as plasticizers in sealant compositions in accordance with this invention.

Example III

Into a reaction vessel equipped with a stirrer, gas sparging means, and an air condenser were charged the following:

12.0 mols adipic acid
1.0 mol fumaric acid
2.3 mols neopentyl glycol
12.0 mols ethylene glycol and
0.3 mol glycerol The stirrer was put into operation and carbon dioxide gas was admitted to sparge the vessel. The vessel then was heated gradually to a temperature between 160° C. and 180° C., the condenser being operated for the first several hours of the esterification reaction to return any glycol to the reaction zone that was entrained with any of the water evolved during the reaction. The condenser then was disconnected and the vessel was heated to 225° C. and maintained at that temperature for 12 to 16 hours. The viscosity of the polyester increased gradually and the reaction was stopped when the polyester had a viscosity of K on the Gardner-Holdt scale for a 50% solution in styrene at 25° C. The polyester had an acid number of 15 at that time.

It has been determined that esterification is aided when azeotropic distillation procedures are employed to carry off the water formed during the reaction. The removal of water formed during the esterification reaction is facilitated by carrying out the esterification in the presence of an azeotroping volatile organic liquid such as toluene, xylene, or the like.

Other polyester resins have been prepared following the procedure described in Example III employing minor changes in the reactants. Thus, the glycol mixture has been varied to comprise as little as 0.5 mol up to 5 mols of neopentyl glycol, the amount of ethylene glycol employed being varied corresponding to maintain the total number of mols of glycol constant. Highly satisfactory results have been obtained employing the glycerol in amounts within the range of 0.25 to 0.35 mol.

To prepare the sealant compositions of this invention, the polyester plasticized epoxy resin-dimer acid resin system, prepared as described hereinabove, is intimately admixed with blowing agents, fillers and one or more epoxy resin curing catalysts.

There are many catalysts which are suitable for use in curing the epoxy resin-containing sealant compositions of this invention. One particularly suitable catalyst comprises a composition of (1) at least one compound selected from the group consisting of organic amines and metal amine chelates and (2) a polyborate ester. This particular catalyst is described completely in copending application Serial No. 749,287, filed July 17, 1958, and assigned to the same assignee as the present invention. A specific example of such a catalyst comprises the cold blended product of two mols of triethanolamine and one mol of trihexylene glycol biborate. Another suitable catalyst is triethanolamine borate, the preparation and epoxy resin curing properties of which are set forth in U.S. Patent No. 2,785,192. Still other suitable epoxy catalyst comprise mixtures of borate esters and trialkylolamine-titanate complexes such as a mixture of butyl borate and isopropyl triethanolamine-titanate complex set forth in U.S. Patent No. 2,809,184. In addition, certain amine and acid anhydride catalysts may be used. The choice of a particular catalyst generally will be determined by the shelf-life desired in the sealant composition prior to its application to the commutator assemblage where it is cured.

The following examples illustrate the preparation of sealant compositions in accordance with this invention.

Example IV

About 196 parts by weight of an epoxy resin-dimer acid adduct prepared in accordance with the procedure described in Example II were charged into a Banbury mixer. The following ingredients then were added in the following sequence, the composition being thoroughly mixed after each addition. 3.6 parts by weight of a catalyst comprising a mixture of triethanolamine and trihexylene glycol biborate; 120 parts by weight of a polyester prepared as described in Example III; 3.2 parts by weight of N-N'-dinitrosopentamethylene-tetramine; and 60 parts by weight of a finely divided silica having an average particle size of less than one micron. After thorough mixing a material of pasty like consistency is obtained. This material when applied to the surface of a steel plate and baked in a vertical position does not flow. The pasty like material may be cured to a thermoset flexible solid in about 10 minutes by heating the same at 150° C. The cured resin exhibits a Durometer hardness of 30–60, excellent tensile strength, and a fine spongy, cellular cross section. Aging for several days at 175° C. or for periods of ½ to 1½ hours at 250° C. does not cause a significant increase in hardness nor loss of the spongy structure.

The following examples are illustrative of other formulations which provide excellent sealant compositions.

*Example V*

| | Parts by weight |
|---|---|
| Epoxy resin of Example I | 56 |
| Liquid $C_{36}$ dimer acid prepared by polymerizing linoleic acid | 140 |
| Triethanolamine borate | 3.6 |
| Polyester resin of Example III | 120 |
| Ammonium carbonate | 3.2 |
| Talc | 50 |

*Example VI*

| | |
|---|---|
| Epoxy resin of Example I | 137 |
| Liquid $C_{36}$ dimer acid prepared by polymerizing linoleic acid | 59 |
| Triethanolamine aluminate | 3.6 |
| Silica | 50 |
| N-N'-dinitrosopentamethylene tetramine | 3.2 |
| Resin of Example III | 120 |

To indicate more fully the advantages and capabilities of the present invention reference now will be made to the accompanying drawing. There is illustrated therein, in a fragmentary longitudinal section, the commutator end of an electrical machine. The numeral 3 refers to a shaft which carries a V ring commutator assembly 4 in accordance with this invention. The commutator assembly is made up of a number of copper commutator bars 5 separated by mica or other insulation of similar bar shape. The copper and mica bars are of similar size and shape with the exception that the insulating bars 6 project rearwardly about ⅛ of an inch beyond the end of the copper commutator bars as indicated on the drawing. Each of the bars 5 and 6 is provided with notches 8 at either end thereof, said notches having inner arch binding surfaces 9 inclined at an angle of approximately 30° and outer surfaces 10 inclined at an angle of about 3° to 6°.

The notches are engaged by insulated clamping V rings 11 which may be made of iron, steel or the like, having inner conical surfaces 12 inclined at an angle matching the inner arch binding surfaces 9 of notches 8 and outer conical surfaces 13 inclined at an angle matching the outer surfaces 10 of notches 8. Electrical insulation between notches 8 and clamping V rings 11 is provided by insulating V rings 14 made of mica or a like insulating material having sufficient thickness to withstand the maximum voltage which may be applied to the commutator member. The relative dimensions of the clamping V rings 11, mica V rings 14, and notches 8 are such that the conical surfaces 12 of clamping members 11 tightly engage the respective inner arch binding surfaces 9 of the notches through the intermediary of the insulating V rings 14. The outer surfaces 13 of clamping V rings 11 are spaced out of pressure transmitting engagement, as indicated by clearance space 15, with respect to the outer surfaces 10 of the associated notches 8, with the insulating V rings 14 interposed therebetween. Clamping V rings 11 have integral portions 17 which extend outwardly from notches 8 beyond the ends of the commutator member. Integral portions 18 of mica V rings 14 also extend outwardly from notches 8 and overlay portions 17 of rings 11.

A sealant 19 comprising the composition of the present invention is disposed in clearance space 15 between portions 18 of mica V rings 14 and outer surfaces 10 of notches 8. Bands of sealant composition 19 are applied to portions 18 of mica V rings 14 while the composition is in a putty like, uncured form. The sealant is cured to a thermoset, flexible tough solid during the processing or manufacture of the commutator. Curing occurs as a result of the application of heat to bars 5 and 6 after the building of the commutator assembly. With clamping members 11 in place, the entire assemblage is heated at 170° C. for about 18 hours and thereafter baked at about 150° C. for about 2 or 3 days.

Sealant composition 19, being flexible, completely seals clearance space 15 against the entrance of dirt, carbon from the commutator brushes, and other foreign matter. The resiliency characteristics of sealant composition 19 enable it to conform to irregularities without excess pressures and thereby avoid raised commutator bars which often appear in commutator assemblies made with previously used non-resilient sealant materials.

In addition to being useful as a sealant in commutator assemblies as herein described, the compositions of this invention also may be used for many other purposes. Thus, they may be used as coating compositions on coils and other pieces of electrical equipment, as surface coatings, and may be made into mats for cushioning machinery.

While the invention has been disclosed with reference to particular embodiments and assemblies, it will be understood of course that many modifications, changes and substitutions may be made therein without departing from its true scope.

We claim as our invention:

1. A composition adapted for sealing commutators comprising an intimate admixture of (A) from 85% to 60% by weight of an epoxy resin-dimer acid plasticized with a polyester resin, there being from 1.25 to 2.5 parts by weight of epoxy resin-dimer acid for each one part by weight of polyester resin, said epoxy resin-dimer acid having been derived by reacting (1) from 10 to 90 parts by weight of the reaction product of from one to ten mols of an epihalohydrin for each one mol of a dihydric phenol with (2) from 90 to 10 parts by weight of the dimerization product of at least one unsaturated fatty acid having from 10 to 24 carbon atoms per molecule, and said polyester plasticizer having been derived by heating above 150° C. but not above 260° C. (*a*) one mol of at least one unsaturated acidic compound selected from the group consisting of fumaric acid, itaconic acid, maleic acid, maleic anhydride, chloromaleic acid, citraconic anhydride, and citraconic acid, (*b*) from 10 to 15 mols of adipic acid, (*c*) from 0.5 to 5 mols of neopentyl glycol, and (*d*) from 14 to 9 mols of ethylene glycol, the glycols providing sufficient hydroxyl groups to exceed by at least 5% but not more than 15% the number of carboxyl groups in the adipic acid and the acidic compound, the heating being continued until the polyester resin has an acid number below 15 and a Gardner-Holdt viscosity of about G to M in a 50% solution in styrene, (B) from 15% to 40% by weight of a finely divided inorganic solid filler of which at least 10% based on the weight of the total composition, is a finely divided silica having an average particle size of less than one micron, and (C) from 0.1% to 15% of a blowing agent.

2. A composition as set forth in claim 1, wherein the polyester resin is derived by reacting from 0.1 to 0.75 mol of glycerol with the components (*a*), (*b*), (*c*) and (*d*).

3. A composition as set forth in claim 1, wherein up to 10 mol percent of the adipic acid is replaced with an equal molar proportion of a saturated dicarboxylic acid.

4. A composition adapted for sealing commutators comprising an intimate admixture of (A) from 85% to 60% by weight of an epoxy resin-dimer acid plasticized with a polyester resin, there being from 1.25 to 2.5 parts by weight of epoxy resin-dimer acid for each one part by weight of polyester resin, said epoxy resin-dimer acid having been derived by reacting (1) from 10 to 90 parts by weight of the reaction product of from one to ten mols of an epihalohydrin for each one mol of a dihydric phenol with (2) from 90 to 10 parts by weight of the dimerization product of at least one unsaturated fatty acid having from 10 to 24 carbon atoms per molecule, and said polyester plasticizer having been derived by heating above 150° C. but not above 260° C. (a) one mol of at least one unsaturated acidic compound selected from the group consisting of fumaric acid, itaconic acid, maleic acid, maleic anhydride, chloromaleic acid, citraconic anhydride, and citraconic acid, (b) from 10 to 15 mols of adipic acid, (c) from 0.5 to 5 mols of neopentyl glycol, and (d) from 14 to 9 mols of ethylene glycol, the glycols providing sufficient hydroxyl groups to exceed by at least 5% but not more than 15% the number of carboxyl groups in the adipic acid and the acidic compound, the heating being continued until the polyester resin has an acid number below 15 and a Gardner-Holdt viscosity of about G to M in a 50% solution in styrene, (B) from 15% to 40% by weight of a finely divided inorganic solid filler of which at least 10% based on the weight of the total composition, is a finely divided silica having an average particle size of less than one micron, and (C) from 0.1% to 15% of a blowing agent, and (D) catalytic amounts of a curing agent effective to thermoset the epoxy resin.

5. A composition adapted for sealing commutators comprising an intimate admixture of (A) from 85% to 60% by weight of an epoxy resin-dimer acid plasticized with a polyester resin, there being from 1.25 to 2.5 parts by weight of epoxy resin-dimer acid for each one part by weight of polyester resin, said epoxy resin-dimer acid having been derived by reacting (1) from 10 to 90 parts by weight of the reaction product of from one to ten mols of an epihalohydrin for each one mol of a dihydric phenol with (2) from 90 to 10 parts by weight of the dimerization product of at least one unsaturated fatty acid having from 10 to 24 carbon atoms per molecule, and said polyester plasticizer having been derived by heating above 150° C. but not above 260° C. (a) one mol of fumaric acid, (b) from 12 to 15 mols of adipic acid, (c) from 2.0 to 2.5 mols of neopentyl glycol, and (d) from 11 to 13 mols of ethylene glycol, the glycols providing sufficient hydroxyl groups to exceed by at least 5% but not more than 15% the number of carboxyl groups in the adipic acid and the acidic compound, the heating being continued until the polyester resin has an acid number below 15 and a Gardner-Holdt viscosity of about G to M in a 50% solution in styrene, (B) from 15% to 40% by weight of a finely divided inorganic solid filler of which at least 10% based on the weight of the total composition, is a finely divided silica having an average particle size of less than one micron, and (C) from 0.2% to 0.8% of a blowing agent.

6. An electric machine comprising a commutator assembly and a body of a tough flexible sealant applied thereto, the sealant comprising the thermoset composition derived by heating a composition comprising an intimate admixture of (A) from 85% to 60% by weight of an epoxy resin-dimer acid plasticized with a polyester resin, there being from 1.25 to 2.5 parts by weight of epoxy resin-dimer acid for each one part by weight of polyester resin, said epoxy resin-dimer acid having been derived by reacting (1) from 10 to 90 parts by weight of the reaction product of from one to ten mols of an epihalohydrin for each one mole of a dihydric phenol with (2) from 90 to 10 parts by weight of the dimerization product of at least one unsaturated fatty acid having from 10 to 24 carbon atoms per molecule, and said polyester plasticizer having been derived by heating above 150° C. but not above 260° C. (a) one mol of at least one unsaturated acidic compound selected from the group consisting of fumaric acid, itaconic acid, maleic acid, maleic anhydride, chloromaleic acid, citraconic anhydride, and citraconic acid, (b) from 10 to 15 mols of adipic acid, (c) from 0.5 to 5 mols of neopentyl glycol, and (d) from 14 to 9 mols of ethylene glycol, the glycols providing sufficient hydroxyl groups to exceed by at least 5% but not more than 15% the number of carboxyl groups in the adipic acid and the acidic compound, the heating being continued until the polyester resin has an acid number below 15 and a Gardner-Holdt viscosity of about G to M in a 50% solution in styrene, (B) from 15% to 40% by weight of a finely divided inorganic solid filler of which at least 10% based on the weight of the total composition, is a finely divided silica having an average particle size of less than one micron, and (C) from 0.1% to 15% of a blowing agent.

7. An electric machine comprising a commutator assembly and a body of a tough flexible sealant applied thereto, the sealant comprising the thermoset composition derived by heating a composition comprising an intimate admixture of (A) from 85% to 60% by weight of an epoxy resin-dimer acid plasticized with a polyester resin, there being from 1.25 to 2.5 parts by weight of epoxy resin-dimer acid for each one part by weight of polyester resin, said epoxy resin-dimer acid having been derived by reacting (1) from 10 to 90 parts by weight of the reaction product of from one to ten mols of an epihalohydrin for each one mole of a dihydric phenol with (2) from 90 to 10 parts by weight of the dimerization product of at least one unsaturated fatty acid having from 10 to 24 carbon atoms per molecule, and said polyester plasticizer having been derived by heating above 150° C. but not above 260° C. (a) one mol of fumaric acid, (b) from 12 to 15 mols of adipic acid, (c) from 2.0 to 2.5 mols of neopentyl glycol, and (d) from 11 to 13 mols of ethylene glycol, the glycols providing sufficient hydroxyl groups to exceed by at least 5% but not more than 15% the number of carboxyl groups in the adipic acid and the acidic compound, the heating being continued until the polyester resin has an acid number below 15 and a Gardner-Holdt viscosity of about G to M in a 50% solution styrene, (B) from 15% to 40% by weight of a finely divided inorganic solid filler of which at least 10% based on the weight of the total composition, is a finely divided silica having an average particle size of less than one micron, and (C) from 0.2% to 0.8% of a blowing agent.

References Cited in the file of this patent

UNITED STATES PATENTS

| | | |
|---|---|---|
| 2,795,009 | Gosnell | June 11, 1957 |
| 2,795,563 | Low | June 11, 1957 |
| 2,831,820 | Aase et al. | Apr. 22, 1958 |